US007226957B1

(12) United States Patent
Scranton et al.

(10) Patent No.: US 7,226,957 B1
(45) Date of Patent: Jun. 5, 2007

(54) METHOD FOR PRODUCING POLYMERS WITH CONTROLLED MOLECULAR WEIGHT AND END GROUP FUNCTIONALITY USING PHOTOPOLYMERIZATION IN MICROEMULSIONS

(75) Inventors: Alec Scranton, Coralville, IA (US); Kaveri Jain, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 10/699,994

(22) Filed: Nov. 3, 2003

(51) Int. Cl.
  C08F 2/22 (2006.01)
  C08F 2/48 (2006.01)
  C08F 12/08 (2006.01)
  C08F 14/08 (2006.01)
  C08F 18/04 (2006.01)
  C08F 20/12 (2006.01)
  C08F 20/44 (2006.01)

(52) U.S. Cl. .............................. 522/7; 522/11; 522/31; 522/37; 522/39; 522/42; 522/44; 522/46; 522/59; 522/53; 522/84; 522/79

(58) Field of Classification Search .................. 522/7, 522/11, 31, 37, 39, 42, 44, 46, 59, 53, 84, 522/79
See application file for complete search history.

(56) References Cited

U.S. PATENT DOCUMENTS 4,521,580 A * 6/1985 Turner et al. ............. 526/307.2
4,956,400 A * 9/1990 Kozakiewicz et al. ...... 523/223
5,521,229 A * 5/1996 Lu et al. ....................... 522/40
5,952,398 A * 9/1999 Dietz et al. .................. 522/184
5,981,602 A   11/1999 Tatarintsev et al.
6,096,795 A * 8/2000 Abusleme et al. ............ 522/33
6,121,397 A   9/2000 MacLeod et al.

(Continued)

FOREIGN PATENT DOCUMENTS

EP    0 391 343 A2 * 10/1990

(Continued)

OTHER PUBLICATIONS

Capek and Fouassier, "Kinetics of Photopolymerization of Butyl Acrylate in Direct Micelles," *Eur. Poly. J.* 33(2):173-181 (1997).

(Continued)

Primary Examiner—Susan Berman
(74) Attorney, Agent, or Firm—Needle & Rosenberg, P.C.

(57) ABSTRACT

A method for producing polymers with controlled molecular weight and desired end functionalities and the resulting polymers. The method comprises a) forming a microemulsion comprising monomer, water, and an effective amount of an effective surfactant, b) adding to the microemulsion an amount of a water-soluble photo-initiator system wherein the initiator system produces one type of monomer-soluble radical active centers and wherein the radical active centers contain desired end group functionalities for a polymer or oligomer, and c) illuminating the microemulsion to photo-initiate polymerization of the monomer wherein the illuminating is according to a temporal and spatial illumination scheme, and wherein the amount of the initiator system and the temporal illumination scheme are chosen to produce a desired molecular weight of the polymer or oligomer. The microemulsion can further comprise an effective amount of an effective co-surfactant. The method can be used to produce polymers and copolymers.

58 Claims, 6 Drawing Sheets

U.S. PATENT DOCUMENTS

| | | | |
|---|---|---|---|
| 6,235,857 B1 | 5/2001 | Rizzardo et al. | |
| 6,709,716 B2 * | 3/2004 | Uy et al. | 427/505 |
| 2003/0181619 A1 | 9/2003 | Matyjaszewsky et al. | |

FOREIGN PATENT DOCUMENTS

| | | |
|---|---|---|
| WO | WO 91/06535 | 5/1991 |
| WO | WO 00/56795 | 9/2000 |

OTHER PUBLICATIONS

Capek and Potisk, "Microemulsion and Emulsion Polymerization of Butyl Acrylate-I. Effect of the Initiator Type and Temperature," *Eur. Poly. J.* 31(12):1269-1277 (1995).

Capek, "Photopolymerizations of Butyl Acrylate Microemulsion. Effect of Reaction Conditions and Additives on Fates of Desorbed Radicals," *Poly. J.* 28(5):400-406 (1996).

Co, et al., "Microemulsion Polymerization. 3. Molecular Weight and Particle Size Distributions," *Macromolecules* 34:3245-3254 (2001).

Kuo, et al., "Photoinitiated Polymerization of Styrene in Microemulsions," *Macromolecules* 20(6):1216-1221 (1987).

Morgan, et al., "Kinetics and Mechanism of Microemulsion Polymerization of Hexyl Methacrylate," *Macromolecules* 30(7):1897-1905 (1997).

Morgan, et al., "Particle Size and Monomer Partitioning in Microemulsion Polymerization. 1. Calculation of the Particle Size Distribution," *Macromolecules* 31:3197-3202 (1998).

Moulik and Paul, "Structure, dynamics and transport properties of microemulsions," *Advances in Colloid and Interface Science* 78:99-195 (1998).

Padon and Scranton, "A Mechanistic Investigation of a Three-Component Radical Photoinitiator System Comprising Methylene Blue, N-Methyldiethanolamine, and Diphenyliofonium Chloride," *J. Poly. Sci. Part A Poly. Chem.* 38:2057-2066 (2000).

Paul, et al., "Microemulsions: An Overview," *J. Disper. Sci. Tech.* 18(4):301-367 (1997).

* cited by examiner

Methylene blue

N-methyldiethanolamine

METHOD FOR PRODUCING POLYMERS WITH CONTROLLED MOLECULAR WEIGHT AND END GROUP FUNCTIONALITY USING PHOTOPOLYMERIZATION IN MICROEMULSIONS

STATEMENT REGARDING FEDERALLY SPONSORED RESEARCH OR DEVELOPMENT

This invention was made with government support under NSF Industry/University Cooperative Research Center (IU-CRC) Grant EEC 00-02971 awarded by NSF. The government may have certain rights in the invention.

BACKGROUND

Free radical polymerization is by far the most widely used chain polymerization technique for industrial applications. These industrial applications include, for example, thin films, coatings, paints, adhesives, optics, dental filling, sealing compound, and stereo-lithography. These reactions offer many advantages over other polymerizations, including 1) high reaction rates, 2) insensitivity to impurities (compared to anionic and cationic polymerizations), and 3) a wide selection of commercially available monomers and oligomers.

Control of molecular weight and end groups (functionalities) is currently accomplished by living anionic polymerization. The active centers in anionic polymerizations are highly reactive carbanions. The reactions carry on until all the monomer has been consumed or the reaction is quenched using water or alcohol. However, these reactions are highly sensitive to oxygen and proton donors (water, alcohols, etc.), and, therefore, it is necessary to exclude any impurities during reaction, which can be a difficult process. Relatively few monomers undergo living anionic polymerization, thereby limiting the polymers that can be formed using this approach.

Emulsion polymerization (macroemulsion polymerization) has been used in industrial processes for water-insoluble and sparingly soluble monomers. In emulsion polymerization monomer is located in monomer droplets, inactive micelles containing monomer, active micelles that become polymer particles where polymerization occurs, and as solute in aqueous phase.

Microemulsion polymerization differs from emulsion polymerization in that the microemulsion contains no monomer droplets and no inactive micelles. Another difference is that all the initiator in a microemulsion exists in the microemulsion droplets so that polymerization only occurs in the monomer reservoir encapsulated in the particle. Microemulsions are also optically transparent.

A number of investigators have studied polymerizations carried out in microemulsions wherein the polymerizable monomer is dispersed in water (Morgan, J. D., Kaler, E. W., "Particle Size and Monomer Partitioning in Microemulsion Polymerization. 1. Calculation of the Particle Size Distribution," Macromolecules, 31, 3197-3202 (1998); Morgan, J. D., Lusvardi, K. M., Kaler, E. W., "Kinetics and Mechanism of Microemulsion Polymerization of Hexyl Methacrylate," Macromolecules, 30(7), 1897-1905 (1997); Kuo, P-L., Turro, N. J., Tseng, C-M, El-Aaseer, M. S., Vanderhoff, J. L., "Photoinitiated Polymerization of Styrene in Microemulsions," Macromolecules, 20(6), 1216-1221 (1987); Paul, B. K., Moulik, S. P., "Microemulsions: An Overview," J. of Dispersion Science and Technology, 18(4), 301-367 (1997); Moulik, S. P., Paul, B. K., "Structure, Dynamics and Transport Properties of Microemulsions," Advances in Colloid and Interface Science, 78, 99-195 (1998); Co, C. C., Cotts, P., Burauer, S., Vries, R. D., Kaler, E. W., "Microemulsion Polymerization. 3. Molecular Weight and Particle Size Distributions," Macromolecules, 34, 3245-3254 (2001); Capek, I., "Photopolymerizations of Butyl Acrylate Microemulsion. Effect of Reaction Conditions and Additives on Fates of Desorbed Radicals," Polymer Journal, 28(5), 400-406 (1996); Capek, I., Fouassier, J. P., "Kinetics of Photopolymerization of Butyl Acrylate in Direct Micelles," Eur. Poly. J., 33(2), 173-181 (1997); Capek, I., Potisk, P., "Microemulsion and Emulsion Polymerization of Butyl Acrylate-I. Effect of the Initiator Type and Temperature," Eur. Polym. J., 31(12), 1269-1277 (1995)). Most of the investigations in the literature have reported thermal polymerizations of microemulsions (Morgan, et al. (1998); Morgan, et al. (1997); Paul, et al (1997); Moulik, et al. (1998); Co, et al. (2001)), and there have been only a few reported of photopolymerizations in microemulsion systems (Capek, I., et al. (1996); Capek, I., et al. (1997); Capek, I., et al. (1995); Kuo, et al. (1987)). These investigators have focused their research on the study of kinetics and mechanisms of reaction, but none have utilized it as a tool to predict and regulate the polymer architecture.

The thermal polymerization studies reported in the literature were motivated by the fact that the microemulsion polymerizations offer better control on the system parameters and are viable with most of the monomers relative to the more conventional emulsion polymerizations (Morgan, et al. (1997)). The studies reported to date have focused primarily on methacrylate and styrene monomers (Kuo, P-L., et al. (1987)) and have focused on creating the phase diagrams for the monomer-in-water microemulsions (Paul, B. K., et al. (1997); Moulik, S. P., et al. (1998)) and on describing the kinetics of the polymerizations (Co, C. C., et al. (2001)). Studies of thermally-initiated microemulsion polymerizations have revealed that this technique yields information about formation of the microemulsions and effect of various classes of surfactants and additives. Information about various techniques of characterization of microemulsions has also been revealed. The thermal polymerizations are generally initiated using either water-soluble initiators, such as ammonium peroxodisulfate, or monomer-soluble initiators, such as azoisobutyronitrile (AIBN).

While the vast majority of the papers on microemulsion polymerizations in the literature focus on thermally-initiated polymerizations, there are a few reports of photoinitiated microemulsion polymerizations. These papers report investigation of photopolymerization of microemulsions by initiation with UV light and have investigated the effect of various additives on the rate of polymerization and the final conversion of monomer (Capek, I., et al. (1996); Capek, I., et al. (1997); Capek, I., et al. (1995)).

Kuo, et al. (1987) photopolymerized styrene in an oil/water microemulsion using dibenzyl ketone (DBK) as an oil-soluble initiator. The polymerization was initiated by UV light. The degree of polymerization and the rate of polymerization were studied as a function of initiator concentration and light intensity. The mechanism of polymerization in microemulsions was discussed on the basis of polymerization rate and particle size. The study did not include choice of end groups for the styrene polymer.

Capek, et al. (1997) looked at the kinetics of photopolymerization of butyl acrylate in an oil/water microemulsion. The polymerization was initiated by UV light. Change in molecular weight relative to monomer and emulsifier concentration was studied. Rate of polymerization was found to be proportional to light intensity. This study did not involve choice of end groups for the butyl acrylate polymer.

In the current invention, various properties offered by microemulsions and photopolymerizations can be utilized to custom make polymers with a higher degree of control of the polymer molecular weight. Also, the polymers can be customized with desired end groups. The invention uses the advantages offered by microemulsions and photopolymerizations to produce commercially useful polymers.

None of the above-cited documents disclose compounds, methods, etc. such as those disclosed or claimed herein.

SUMMARY OF THE INVENTION

A method is disclosed for producing a polymer or oligomer with controlled molecular weight and desired end group functionality comprising a) forming a microemulsion comprising monomer, water, and an effective amount of an effective surfactant, b) adding to the microemulsion an amount of a water-soluble photo-initiator system wherein the initiator system produces one type of monomer-soluble radical active centers and wherein the radical active centers contain desired end group functionalities for a polymer or oligomer, and c) illuminating the microemulsion to photoinitiate polymerization of the monomer wherein the illuminating is according to a temporal and spatial illumination scheme, and wherein the amount of the initiator system and the temporal illumination scheme are chosen to produce a desired molecular weight of the polymer or oligomer. The microemulsion can further comprise an effective amount of an effective co-surfactant.

Also, a method is disclosed for producing a copolymer comprising a) forming a microemulsion comprising monomer, water, and an effective amount of an effective surfactant, b) adding to the microemulsion an amount of a water-soluble photo-initiator system wherein the initiator system produces one type of monomer-soluble radical active centers and wherein the radical active centers contain desired end group functionalities for a polymer or oligomer, and c) illuminating the microemulsion to photoinitiate polymerization of the monomer wherein the illuminating is according to a temporal and spatial illumination scheme, and wherein the amount of the initiator system and the temporal illumination scheme are chosen to produce a desired molecular weight of the polymer or oligomer, and d) reacting the end group functionalities of the polymers or oligomers to produce copolymers.

Further disclosed is a polymer produced by a method comprising a) forming a microemulsion comprising monomer, water, and an effective amount of an effective surfactant, b) adding to the microemulsion an amount of a water-soluble photo-initiator system wherein the initiator system produces one type of monomer-soluble radical active centers and wherein the radical active centers contain desired end group functionalities for a polymer or oligomer, and c) illuminating the microemulsion to photoinitiate polymerization of the monomer wherein the illuminating is according to a temporal and spatial illumination scheme, and wherein the amount of the initiator system and the temporal illumination scheme are chosen to produce a desired molecular weight of the polymer or oligomer.

Additionally disclosed is a copolymer produced by a method comprising a) forming a microemulsion comprising monomer, water, and an effective amount of an effective surfactant, b) adding to the microemulsion an amount of a water-soluble photo-initiator system wherein the initiator system produces one type of monomer-soluble radical active centers and wherein the radical active centers contain desired end group functionalities for a polymer or oligomer, and c) illuminating the microemulsion to photoinitiate polymerization of the monomer wherein the illuminating is according to a temporal and spatial illumination scheme, and wherein the amount of the initiator system and the temporal illumination scheme are chosen to produce a desired molecular weight of the polymer or oligomer, and d) reacting the end group functionalities of the polymers or oligomers to produce copolymers.

In the current invention, various properties offered by microemulsions and photopolymerizations can be utilized to custom make polymers with a higher degree of control of the polymer molecular weight. The invention can use the advantages offered by microemulsions and photopolymerizations to produce commercially useful polymers.

Disclosed herein is a method based upon microemulsions and photopolymerizations to produce polymers with specified end group functionalities and a relatively monodisperse molecular weight distribution through free radical polymerizations.

Microemulsions are thermodynamically stable dispersions of immiscible liquids (in this case, an organic monomer in water). The fact that they are optically transparent makes them attractive for polymerizations initiated with light. Photopolymerizations offer spatial as well as temporal control of active center generation. In addition, a number of heat-sensitive substrates can be used for this system, which is highly energy efficient and convenient. The small size of microemulsion droplets facilitates the regulation of the size of the polymer that can be synthesized, ranging from oligomers to long chain polymers. Microemulsions also separate the monomer phase from the bulk phase and, hence, radicals can diffuse into the droplets from outside, thereby providing better control of the polymer size.

The invention includes a method for 1) regulating the molecular weight of the polymer by combining a microemulsion and photopolymerization to effectively control the time between initiation and termination and 2) specifying the polymer end groups through the selection of the initiator.

An important aspect of a method of the invention is the use of water-soluble initiator systems that yield only one type of monomer-soluble radical active centers. These hydrophobic active centers can enter the monomer droplets to initiate polymerization. If water-soluble free radical centers are also produced, they will tend to remain in the aqueous phase (until they combine) and will not initiate polymerization in the monomer droplets. Initiator systems which meet this guideline are taught. A functionality of the polymer end group can be determined by the chemical structure of the initiating radical. The time between initiation and termination of polymerization (and, therefore, the polymer molecular weight) can be varied by specifying 1) the initiator concentration as well as 2) the temporal illumination scheme (i.e., continuous or intermittent illumination).

A method of the invention can be used as a pathway for producing end-functionalized polymers that could subsequently be used to create block copolymers (if the monomer undergoes termination by combination and both end groups are the same) or graft copolymers (if termination occurs by disproportionation) by reaction with the functionalized end groups. For example, an end functionalized polymer can be created, separated from the microemulsion, purified, and then utilized in a block or graft copolymerization reaction.

A method of the present invention can be applied in a wide range of coating industries. For example, in the automotive industry, the current coating method utilizes two coat paints. The bottom is a urethane coat while the top is an acrylate painted on to improve shine and abrasion resistance. A method and composition of the invention allow the polymer synthesized to be used for a single coat thereby saving time and expense over the two coat method and at the same time improving attributes such as clarity, resilience, and transparency of the coating.

Additional advantages will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below.

DETAILED DESCRIPTION

Figure 1:
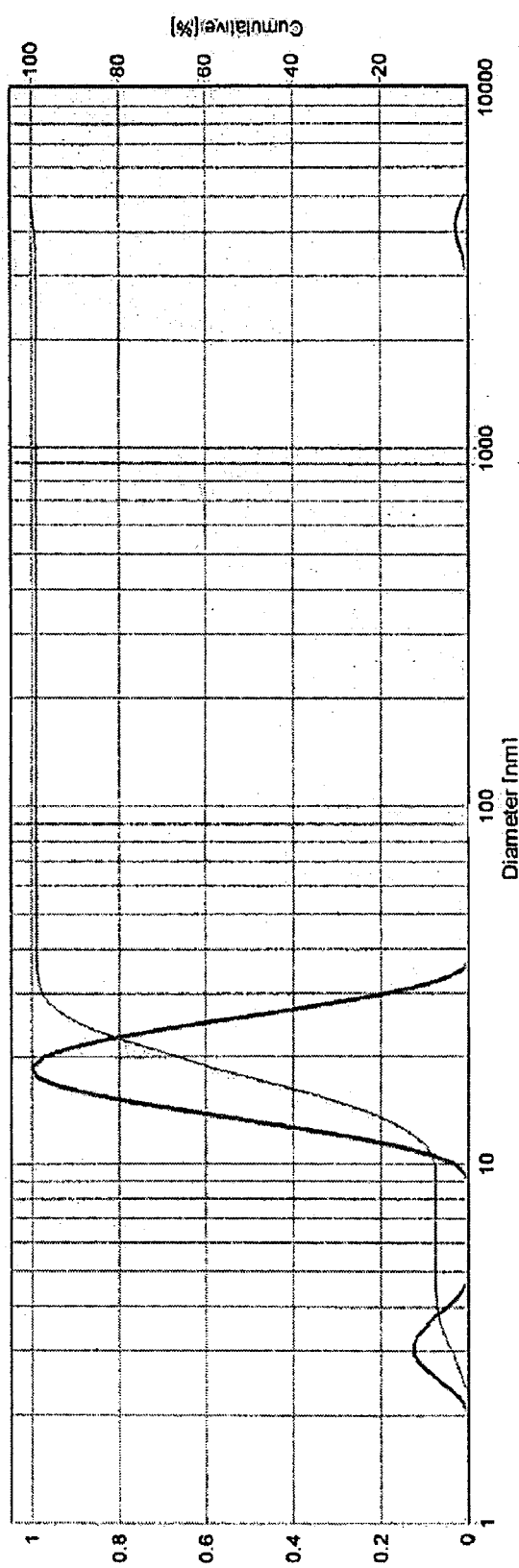
FIG. 1 shows dynamic light scattering spectrum for a microemulsion containing 1 g of butyl acrylate solubilized in 5 g of water using 1 g of sodium dodecyl sulfate and 3 g of 1-pentanol. Sample conditions: temperature=295.160 K, viscosity=0.9599 cp, and wavelength=532 nm. The graph shows particle size distribution of filtered runs, intensity weighted. 1

Before the present compounds, compositions, articles, devices, and/or methods are disclosed and described, it is to be understood that the aspects described below are not limited to specific synthetic methods, since they may, of course, vary.

It is also to be understood that the terminology used herein is for the purpose of describing particular aspects only and is not intended to be limiting.

In this specification and in the claims which follow, reference will be made to a number of terms which shall be defined to have the following meanings:

It must be noted that, as used in the specification and the appended claims, the singular forms "a," "an," and "the" include plural referents unless the context clearly dictates otherwise. Thus, for example, reference to "an initiator" includes mixtures of initiators; reference to "a monomer" includes mixtures of two or more such monomers, and the like.

"Optional" or "optionally" means that the subsequently described event or circumstance may or may not occur, and that the description includes instances where said event or circumstance occurs and instances where it does not. For example, the phrase "optionally reacting end groups" means that the end groups may or may not be reacted and that the description includes both the reaction of end groups and no reaction of end groups.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

References in the specification and concluding claims to parts by weight, of a particular element or component in a composition or article, denote the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

By the term "effective amount" of a composition or property as provided herein is meant such amount as is capable of performing the function of the composition or property for which an effective amount is expressed. As will be pointed out below, the exact amount required will vary from process to process, depending on recognized variables such as the composition employed and the processing conditions observed. Thus, it is not possible to specify an exact "effective amount." However, an appropriate effective amount may be determined by one of ordinary skill in the art using only routine experimentation.

The term "polymer" as used herein can generally also refer to an oligomer.

Instances of use where only the term "polymer" is used, as opposed to "polymer or oligomer" should not be assumed to mean a reference to only a polymer.

Described herein is a method based upon microemulsions and photopolymerizations to produce polymers with specified end group functionalities and a relatively monodisperse molecular weight distribution through free radical polymerizations. Photopolymerizations are carried out in microemulsions of a monomer in water with the goal of producing polymers with controlled molecular weight and specified end groups.

A method of the present invention can be used as a pathway for producing end-functionalized polymers that can subsequently be used to create block copolymers (if the monomer undergoes termination by combination and both end groups are the same) or graft copolymers (if termination occurs by disproportionation) by reaction with the functionalized end groups.

A method of the invention involves the formation of a microemulsion of an organic monomer in water, then photopolymerizing with a water-soluble initiator system that produces monomer-soluble active centers. Aspects of the method include 1) selection of monomers which, by virtue of their preferred mode of termination, determines whether each chain contains one or two end groups of the specified functionality, 2) preparation of the microemulsion (which includes proper selection of the surfactant and co-surfactant), and 3) design of the initiator system which is water soluble, but produces oil-soluble active centers (typically free radicals) upon absorption of light of the proper wavelength.

Monomer

A monomer for use in a method of the invention is a free radically polymerizable monomer. A free radically polymerizable monomer is one which will undergo free radical polymerization. One or more than one free radically polymerizable monomer can be used. Also, the monomer used in the current invention is insoluble in water and preferably non-volatile. One of skill in the art is able to determine which monomer(s) to use for a desired polymer.

Essentially any monomer that undergoes free radical polymerization and is insoluble in water can be used in a method of the invention. In general, these monomers contain a carbon double bond. Some classes of monomer that undergo free radical polymerizations include, but are not limited to, acrylates, methacrylates, styrene, α-methyl styrene, 1,3-dienes, halogenated olefins, vinyl esters, acrylonitrile, methacrylonitrile, acrylamide, and methacrylamide.

One such monomer is an acrylate monomer, specifically a butyl acrylate monomer.

Free-radically-polymerizable, water-insoluble monomers are commercially available or readily obtained by methods known in the art.

The amount/concentration of free radically polymerizable monomer added in the polymerization system is that which is sufficient to fulfill the purposes of the free radically polymerizable monomer in the system. One of skill in the art would be able to determine the amount, or concentration, of a particular free radically polymerizable monomer to use in a particular embodiment for the desired polymer. For example, the amount of monomer to be used in the microemulsion can be determined based on knowledge of the other components of the microemulsion; use of tools such as hydrophile-lipophile balance number guidelines, phase diagrams, and fish diagrams; and routine experimentation. These tools are discussed further below.

In a method of the invention, the specified end group functionalities of the polymer ultimately arise from the initiator fragments that are produced when the water-soluble initiators generate monomer-soluble active centers. Whether the polymer chain contains one or two end groups of the specified functionality(ies) can be determined by the selection of monomer since the monomer(s) will have a preferred mode of termination.

Therefore, to produce a polymer that has specified functionalities at both ends, the growing polymer chain can terminate by combination. Several criteria can be used for selection of a monomer to use if functionalization on both ends is desired:

polymerize by free radical mechanism,
insoluble in water,
terminate by combination, and
preferably non-volatile.

Examples of a monomer that can be used for functionalization on both ends are methyl acrylate, ethyl acrylate, butyl acrylate, hydroxyethyl acrylate, other alkyl acrylates, acrylonitrile, styrene, or mixtures thereof.

To produce polymers with a specified functionality on only one end group, the growing chain can terminate by disproportionation rather than by combination. In general, monomers with readily abstractable hydrogens near the free radical group will tend to undergo termination by disproportionation, and the degree of disproportionation varies with temperature (for example, extent of disproportionation in methyl methacrylate increases from about 67% at 25° C. to about 80% at 80° C.). Any chain that terminates by combination can produce polymers functionalized at both ends; therefore, a mixture of both double functionalized chains and single functionalized chains will often be formed. Disproportionation increases when the propagating radical is sterically hindered or has many β-hydrogens available for transfer. Several criteria can be used for selection of a monomer to use if functionalization on one end is desired:

polymerize by free radical mechanism,
insoluble in water,
terminate by disproportionation, and
preferably non-volatile.

Examples of a monomer that can be used for functionalization on one end are methyl(methacrylate), hydroxyethyl methacrylate, ethene, hexanediol dimethacrylate, vinyl chloride, methyl acrylate, other alkyl methacrylates, or mixtures thereof.

Monomer-in-Water Microemulsion

Microemulsions are thermodynamically stable against coalescence and form spontaneously upon the addition of a surfactant and a co-surfactant, collectively referred to as amphiphiles, to a mixture of organic phase and water. Microemulsions exhibit a relatively monodisperse droplet distribution of small droplets (diameters are typically in the about 100 to about 1000 Angstrom range). The optical clarity of microemulsions in the UV and visible regions of the spectrum make them attractive for photopolymerization systems.

In contrast, the more conventional class of dispersed system, referred to as emulsions, are not thermodynamically stable (will coalesce with time), have larger droplets, and are typically not transparent (are translucent or opaque). Emulsions are generally polydisperse in nature as opposed to microemulsions.

In a method of the current invention, the monomer described above, the surfactant and co-surfactant described below, and water are combined to form a microemulsion.

A variety of tools have been developed in the art to aid in the identification of conditions and compositions that will lead to the successful formulation of microemulsions, namely hydrophile-lipophile balance (HLB) guidelines, phase diagrams, fish diagrams, etc. Each of these is discussed below.

The simplest guidelines for identifying conditions that can be used to produce microemulsions are those based upon the HLB number of the surfactant. This approach is applied primarily to nonionic surfactants, and each surfactant is assigned an HLB number, which is an empirical property used to define the interfacial activity. For common nonionic surfactants based upon ethylene oxide, the HLB numbers generally ranges between 1 and 40, with the surfactants at the low end of the range having relatively longer hydrocarbon tails (for example, Tergitol® 15S5 [a mixture of alcohols and ethoxylates] has an HLB of 10.5), and those at the high end of the range possessing long ethylene oxide (hydrophilic) chains (for example, Tween® 80 [polyoxyethylene sorbitan monooleate] has an HLB of 15.0). Generally, for a highly hydrophobic monomer, the surfactant should have a higher HLB number. For example, microemulsification of a hydrophobic soybean oil may require a surfactant having an HLB value of 20, whereas a small-chain monomer may be stabilized with a surfactant having an HLB value of 8.

The general guidelines discussed above provide some insight into the selection of surfactants to produce microemulsions. However, a more detailed understanding of the conditions that lead to microemulsions are provided in phase diagrams in which the regions where microemulsions are produced are mapped out as a function of two or more thermodynamic properties (typically, component concentrations or the HLB value). One convenient method of presenting these conditions is a triangular phase diagram in which the relative concentrations of oil, water, and surfactant (for a given surfactant and a fixed surfactant/co-surfactant ratio) are plotted on the three axes. In the past two decades, a number of researchers have developed numerous ternary phase diagrams for microemulsions of a variety of hydrocarbons produced using nonionic surfactants. Although enormous work has been done on the construction of phase diagrams of a variety of combinations of hydrocarbons, there have been few reported studies on the phase diagrams of monomer systems, especially acrylates and methacrylates.

A specific type of phase diagram that has been found to be especially useful for identifying nonionic surfactant formulations that will lead to microemulsions are called "fish" diagrams (the term "fish" arises from the characteristic shape of these diagrams). Each fish diagram is constructed for a fixed volume ratio of oil to water (generally close to 50/50), with a surfactant/co-surfactant formulation that is varied systematically. Therefore, one axis of the phase diagram corresponds to the surfactant concentration, and the other is a variable that characterizes (or changes) the surfactant strength, such as the HLB (or temperature). In this surfactant concentration/surfactant strength space, the lines on the fish diagram represent the boundaries between regions that correspond to different types of phases. The three phase region (O/W, bicontinuous, and W/O) is the body of the fish, and the tail of the fish is the one phase region (O/W or W/O). This identification of phase behavior provides the minimum amount of surfactant required to form single phase microemulsions of a monomer in water.

In the case of ionic surfactants, equal quantities of water and oil are taken in a tube, and ionic surfactant is added in varied quantities (in combination with a variety of co-surfactants). The center phase, where the two immiscible liquids (oil and water) mix, is extracted out and analyzed to determine the composition of its constituents.

In general, formation of a microemulsion requires extensive, but routine, experimentation.

Surfactant/Co-Surfactant

While emulsions of monomers in water may be readily formed, it is much more difficult to form monomer-in-water microemulsions at room temperature. For a given monomer, routine experimentation with a variety of surfactant and co-surfactant systems may be required to successfully form a microemulsion.

As discussed above, generally, an emulsifier for a microemulsion can be chosen based on its calculated HLB number with the required HLB of the oil to be emulsified. The HLB is an empirical property used to define the surface activity.

An example of a review article which includes discussion of emulsifier selection is Paul and Moulik (1997), hereby incorporated by reference for its teachings on emulsifier selection. Depending upon the type of microemulsion required (e.g., Winsor types), a variety of surfactants (e.g., anionic or nonionic) and co-surfactants can be selected, as well as appropriate blends and concentrations, that is most suitable to the monomer chosen. One of skill in the art can determine an appropriate effective surfactant and effective co-surfactant to use for a given monomer and a desired microemulsion.

Surfactant (commonly known as detergent) is a big molecule with a hydrophobic and hydrophilic entity. A co-surfactant is a small chain alcohol molecule which helps in reaching the equilibrium state where the two immiscible liquids solubilize into each other.

Further description of choice of surfactant and co-surfactant is described above.

Suitable classes of surfactant and co-surfactant include, for example, anionic or nonionic amphiphiles.

Examples of surfactant that can be used in a method of the invention include, but are not limited to, sodium dodecylsulfate (SDS) (anionic), Triton® (X-100, X-114) [octyl phenoxy poly(ethoxy)ethanol] (nonionic), Tergitol® (15S5, 15S7) [alcohols and ethoxylates] (nonionic), Neodol® (91-2.5) [propylene oxide/ethylene oxide copolymer] (nonionic), Brij® 97 [polyoxyethylene-10-oleyl ether], Mazol® 80 MG Kosher [ethoxylated monodiglycerides] (nonionic), or mixtures thereof.

Examples of a co-surfactant that can be selected are propanol, butanol, pentanol, hexanol, heptanol, dodecanol, hexadecanol, ethylene glycol, glycerin, propylene glycol, or mixtures thereof.

A few studies have showed that a surfactant only can be sufficient to form a microemulsion, especially when a nonionic surfactant is used. However, with ionic surfactants, presence of a co-surfactant is required.

The surfactant and co-surfactant are commercially available. One of skill in the art can determine the amount and type of each for use in the current invention. For example, the use of phase diagrams is discussed above.

Initiator System

A method of the current invention also comprises addition of an initiator system to a microemulsion comprising monomer, water, and surfactant (and, if needed, co-surfactant).

An important aspect of a method of the invention is the design of the initiator system. The invention utilizes active centers that are produced in the water phase, but have the propensity to enter the organic, monomer phase. Therefore, the initiator(s) is water soluble, but the resulting active centers should be monomer soluble. The initiator system can be any water-soluble initiator which produces active centers that will preferentially partition into the monomer phase.

An important aspect of a method of the invention is selection of the polymer end groups through the use of water-soluble initiator systems that yield only one type of monomer-soluble radical active centers. These hydrophobic active centers enter the monomer droplets to initiate polymerization and, thus, become polymer end groups. If water-soluble free radical centers are also produced, they will remain in the aqueous phase (until they combine) and will not initiate polymerization in the monomer droplets and, therefore, will not become polymer end groups.

Several possible initiator systems which meet this guideline are described herein. The functionality of the polymer end group is determined by the chemical structure of the initiating radical. Examples of an end group functionality that can be imparted using this technique include, but are not limited to, hydroxyl, isocyanate, cyanide, nitro, nitrile, and amine groups. End groups such as hydroxyl functionalities are interesting because they can be subsequently reacted with a variety of groups to make block or graft copolymers. For example, an alcohol end group could be reacted with an isocyanate end group of another chain to produce urethane linkages or could be reacted with an acid chloride end group of another chain.

The initiator is generally dissolved in the aqueous phase, and upon photolysis, the active radical centers formed enter the monomer droplets to initiate polymerization. The polymer molecular weight can be tailored by controlling the concentration of the initiator in the system which, in turn, controls the time between initiation and termination of the active free radical chain. For example, if the number of active centers is small compared to the number of droplets, then few droplets will contain more than one active radical center, and the polymer molecular weight will be relatively large. Increasing the number of active centers can have a corresponding decrease on the polymer molecular weight. The molecular weight of the polymer produced in the monomer droplets depends upon the time that elapses between entry of successive active centers into monomer droplets and, therefore, depends upon the time for diffusion of the active centers to the droplets.

Most traditional photoinitiators consist of a single chemical component that produces free radicals by unimolecular photolysis upon absorption of light. For use in a method of this invention, the photo-fragmentation initiator(s) should be water soluble, but produce free radicals that are soluble in the monomer. Possible single-component photo-fragmentation photoinitiators include, but are not limited to, hydroxyl alkyl ketone (HAP), 4-(2-hydroxyethoxy)phenyl-(2-hydroxy-2-propyl)ketone (HPPK), methyl thio phenyl morpholino ketone (TPMK), or sulfonic ester of α-hydroxy methyl benzoin derivatives.

Hydrogen abstraction photoinitiators consist of a component that produces free radicals by hydrogen abstraction upon absorption of light. In the excited state these molecules can abstract a hydrogen atom from a wide variety of compounds including alcohols, furans, water, amines, thiols, and others. For use in a method of this invention, a hydrogen abstraction initiator should be water soluble, and the hydrogen-donating molecule should be either water-soluble or surface active. Possible hydrogen abstraction photoinitiators include, but are not limited to, iodonium salt, triaryl sulfonium salt, amino ketone (for example, 4-morpholino phenyl amino ketone), acetophenone, benzophenone, thioxanthone, or benzyl.

One especially convenient class of initiator system that meets the desired criteria (water soluble initiators that generate monomer-soluble active centers carrying the desired functionality) and is effective for visible light initiation is a two-component initiator that produces active centers by photo-induced electron transfer. These two-component initiator systems contain one light-absorbing component and a second component which reacts with the excited state of the light-absorbing molecule.

Criteria for selection of a light-absorbing molecule of a two-component initiator system are absorbs light in the desired initiating region of the spectrum (it is typically preferred that the effective initiating wavelength be in the visible region of the spectrum to minimize the deleterious effects of light scattering and to prevent absorption of the initiating light by the monomer; also, the presence of an effective wavelength in the visible region is cheaper and readily available for commercial processes);

should be water soluble;

if the second component is an electron donor, such as an amine, the light-absorbing molecule should have a reduction potential that makes the electron transfer thermodynamically feasible; and if the second component is an electron acceptor, such as an iodonium salt, the light-absorbing molecule should have an oxidation potential that makes the electron transfer thermodynamically feasible.

Possible light-absorbing molecules for a two-component system include, but are not limited to, methylene blue, rose bengal, eosin Y, fluorescein, rhodamine (123, 6G, B), sulforhodamine 101, cyanine, or mixtures thereof.

If the second component of a two-component initiator system is an electron donor, such as an amine, it should meet the following criteria:

it should be water soluble, or interfacially active, so that it can participate in electron transfer with the water-soluble, photo-excited light-absorbing molecule;

it should have an oxidation potential that makes the electron transfer to the photo-excited light-absorbing molecule thermodynamically feasible;

the free radical active centers formed by electron transfer/proton transfer from the electron donor to the photo-excited light-absorbing molecule should be soluble in the monomer; and the free radical active centers formed by electron transfer/proton transfer from the electron donor to the photo-excited light-absorbing molecule should possess functionalities that are desirable to have as the polymer end group (for example, hydroxyl group if it is desired to have the end group react with an acid chloride or an isocyanate functionality).

Possible electron donor molecules for such an initiator system, include, but are not limited to, trimethylamine, 1,2',3"-trichlorotripropylamine, triethylamine, N,N-dimethylpentylamine, N,N-dimethyl-m-nitroaniline, dimethylethanolamine (DMEA), N,N-dimethylcyclohexylamine, 3,3',3"-nitrilotripropionic acid, N-ethyl-N-propyl-1-acridinamine, N-phenylglycine, N,N-dimethylacetamide, N,N-dimethylurea, methyldiethanolamine (MDEA), N,N-dimethylbenz[a]antracen-6-amine, 3,9-dimethyl-3,6,9-triazadodecanedioic acid, N-ethyl-N-propylaniline, or N,N-diethyl-2-furanamine.

If the second component of a two-component initiator system is an electron acceptor, such as an iodonium compound, it should meet the following criteria:

it should be water soluble, or interfacially active, so that it can participate in electron transfer with the water-soluble, photo-excited light-absorbing molecule; it should have a reduction potential that makes the electron transfer between the photo-excited light-absorbing molecule and electron acceptor thermodynamically feasible;

the free radical active centers formed by electron transfer/proton transfer from the photo-excited light-absorbing molecule to the electron donor should be soluble in the monomer; and the free radical active centers formed by the electron transfer/proton transfer should possess functionalities that are desirable to have as the polymer end group.

A possible electron acceptor second component includes, but is not limited to, diazonium salt, diphenyl iodonium salt, triphenyl sulfonium salt, dialkyl-4-hydroxyphenlsulfonium salt, dialkyl phenacyl sulfonium salt, pyrylium salt, thiopyrylium salt, pyridinium salt, or quinolinium salt.

An appropriate initiator system can be selected by one of ordinary skill in the art based on the rest of the polymerization system and the desired polymer. Initiators are commercially available or can be readily prepared by one of ordinary skill. The amount of initiator to use in a given microemulsion can be determined by one of ordinary skill in the art based upon the desired molecular weight of the final polymer. For example, about 0.1 to about 10 wt. % of the monomer can be used, with the preferred concentration in the range of about 4 to about 6 wt. % of the monomer.

Method

The invention includes a method for producing a polymer or oligomer with controlled molecular weight and desired end functionality comprising a) forming a microemulsion comprising monomer, water, and an effective amount of an effective surfactant, b) adding to the microemulsion an amount of a water-soluble photo-initiator system wherein the initiator system produces one type of monomer-soluble radical active centers and wherein the radical active centers contain desired end group functionalities for a polymer or oligomer, and c) illuminating the microemulsion to photoinitiate polymerization of the monomer wherein the illuminating is according to a temporal and spatial illumination scheme, and wherein the amount of the initiator system and the temporal illumination scheme are chosen to produce a desired molecular weight of the polymer.

The method can further comprise addition of an effective amount of an effective co-surfactant when forming the microemulsion.

An oil-in-water microemulsion is prepared with the monomer, surfactant, and water. The microemulsion can also comprise a co-surfactant. The amounts of each can be determined by one of ordinary skill in the art and considerations for determination of the amount are described above. An initiator system is added. The amount of initiator system can be determined by one of ordinary skill in the art and is described above. The concentration of initiator chosen is dependent on the desired molecular weight of the resulting polymer.

The choice of monomer, surfactant, co-surfactant, and initiator system are discussed above. Discussions of proper selection of effective surfactant and effective co-surfactant are expanded upon above.

A microemulsion of the method can be formed, for example, at room temperature with gentle mixing. One of skill in the art can readily determine conditions for forming a microemulsion of the method.

A method of the current invention can be carried out at about room temperature. One of skill in the art can readily determine conditions for performing the steps of a method of the current invention.

An illuminating step initiates the photopolymerization. The wavelength of illumination can be determined by one of ordinary skill in the art. The wavelength can, for example, be in the visible spectrum or in the ultraviolet (UV) spectrum. Choice of wavelength depends on choice of initiator system since the initiator system can produce active centers upon absorption of a proper wavelength (likewise, choice of initiator system can be dependent on the desired wavelength of illumination as discussed above). The illumination is according to an illumination scheme. The illumination scheme can be both temporal and spatial. The illumination scheme can determine temporal and spatial generation of active centers. The temporal illumination scheme can determine the time between initiation and termination of the polymerization and, thus, the molecular weight of the polymer. For example, the illumination can be continuous or intermittent.

The molecular weight of the polymer can be determined by the time between initiation and termination of polymerization. The time between initiation and termination can be controlled by concentration of initiator system and/or the illumination scheme of the method. For example, termination can occur when there are no more active centers being generated by cessation of illumination and/or exhaustion of the initiator system. For example, the polymer size/molecular weight can be inversely dependent on the initiator concentration in the system. For example, the number average degree of polymerization can decrease linearly with an increase in initiator concentration. Further, the polydispersity of the polymer can be controlled. For example, more monodisperse polymer can result in the present invention relative to conventional free radical polymerization. For example, the present invention can give a product with a polydispersity index of about 1-2, whereas a conventional free radical polymerization has a theoretically best possible polydispersity index of 2-5.

The end group functionalities on the polymer can be determined by choice of initiator system. Choice of initiator system is discussed above. The number of end group functionalities on the polymer can be a function of choice of monomer. This choice is also described above.

The invention includes a method for producing a block or graft copolymer based upon (pre)polymers produced using a method of this invention. A method for producing a copolymer can further comprise reacting the polymer or oligomer with desired end functionalities to form a copolymer.

Figure 6:
FIG. 6 is an example polymer chain with hydroxyl end groups at both ends.

A method for producing a copolymer can further comprise extracting out the end functionalized polymer (formed as described above) after the reaction and then purifying it. Thus, two (or more) prepolymers (with appropriate end groups, for example, hydroxyls and isocyanates) synthesized separately can be subsequently polymerized further by reaction of their end groups to form a macro-copolymer. FIG. 6 illustrates a prepolymer with the hydroxyl end groups at both the ends, which can be used for block copolymerization. These kinds of prepolymers are referred to as a telechelic polymer (containing one or more functional end groups that have the capacity for selective reaction to form bonds with another molecule).

Another type of copolymer is a graft copolymer in which one or more blocks of prepolymer are grafted as branches onto a main branch of polymer. For this, a prepolymer is synthesized which has two functionalities (for example, hydroxyl groups) at only one end and this prepolymer grafts itself to two different chains containing isocyanate functionality(ies) to form a graft urethane macro-copolymer.

If the monomer undergoes termination by combination and both end groups are the same, the polymer can be a block copolymer. If the monomer undergoes termination by disproportionation, the polymer can be a graft copolymer.

Composition

A composition of the present invention is produced by a method described above. Various oligomers, polymers, and copolymers can be produced by a method of the present invention. It is believed that a number of these compositions cannot currently be made by other known polymerization methods.

For example, there are monomers that do not undergo anionic polymerization. Anionic polymerization has to be carried out under extremely regulated and purified conditions and is mainly limited to styrene and its derivatives, vinyl monomers, and alkyl methacrylates. However, in the method of the present invention, the monomers that can be used are not so limited.

This invention can be used as a pathway for producing a wide variety of end functionalized polymers that can subsequently be used to create block copolymers or graft copolymers by reaction with the functionalized end groups. A method for producing these copolymers is discussed above.

Application

One potential application of block copolymers formed using a method of this invention is the production of urethane/acrylate block copolymers for clear and resilient coatings to be used in a variety of industries, most notably the automobile industry. A method of this invention can be used to create acrylate polymers or oligomers that are functionalized either on both ends or only one end with one or more hydroxyl groups (alcohol functionalities). For example, if each end group possesses one hydroxyl group, the acrylate polymer will be a diol, whereas if each end group contains two hydroxyls, the acrylate will be a tetraol. To produce a urethane/acrylate block copolymer, the acrylate diol would be reacted with a diisocyanate molecule (a monomer, oligomer, or polymer). To produce a cross-linked urethane/acrylate polymer, a tetraol would be reacted with the diisocyanate. Finally, a urethane/acrylate graft copolymer could be produced by reacting an acrylate polymer that is functionalized with two alcohols at just one end with the diisocyanate.

Acrylic enamels that are currently being used in the coating industries require one to two coats to cover and dry to a hard, durable finish. They resist ultraviolet oxidation and environmental hazards better because they dry much harder. However, enamels take a long time to cure and require almost perfect application conditions because dust cannot be rubbed as this would break the outer paint and make the surface rough. Acrylic enamel can be sprayed over most lacquer or urethane paint conveniently.

Urethanes are one of the newest types of paint for automobiles and have been used in the airline industry for their durability. DuPont's Imron® brand is urethane paint used in a two step painting system called base coat-clear coat. The base coat is the color, and the clear coat helps give the based coat a deep rich gloss.

The current invention could effectively solve this problem of double coat and can give a fine finish in a single coat using a urethane/acrylate block or graft copolymer.

Acrylic urethane coatings and adhesives find a very wide variety of use in commercial industry. Therefore, the impact of the current invention could be far reaching. Some of the industries that could benefit from this invention are, for example, automobile and aero industries, wood coating industry, plastic and chemical industries, resin industry, food processing plants and breweries, pulp and paper mills, fertilizer plants, power generating plants, oil field equipment, waste water treatment plants, highway and mining equipment, bridges, towers and other construction equipment, and bottling plants.

Other applications of the method and composition of the invention will be apparent to one of skill in the art.

The discussion below and Examples illustrate that this invention provides a very convenient technique utilizing photopolymerization to prepare monodisperse polymers. The experimental results illustrate the ability to achieve a higher degree of control on the polymer chain length than is possible in a standard free radical polymerization, and polymers were produced of a predictable molecular weight by controlling the initiator concentration. In addition, the ability to impart a desired functionality to the polymer end group was demonstrated. Further, any apparatus used for the complete polymerization and purification was fairly simple.

EXAMPLES

The following examples are put forth so as to provide those of ordinary skill in the art with a complete disclosure and description of how the compounds, compositions, articles, devices, and/or methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example 1

Microemulsion Based on Butyl Acrylate

Oil-in-water microemulsions were prepared using butyl acrylate as the monomer, sodium dodecylsulfate as surfactant, and 1-pentanol as co-surfactant.

A series of experiments were performed with the goal of producing microemulsions containing the maximum amount of oil emulsified in water by using various combinations of surfactants and co-surfactants. In general, pentanol was found to be a more effective co-surfactant than hexanol, and was, therefore, used for most of the studies. Studies were carried out using three families of nonionic surfactants: Triton® (octyl phenoxy poly(ethoxy)ethanol), Tergitol® (alcohols and ethoxylates), and Neodol® (propylene oxide/ethylene oxide copolymer). These surfactants were studied both separately, as well as in combination with one another. The Tergitol® and Triton® were found to be more effective than the Neodol® family.

Initially, Triton® (EO value 8 and 10) was investigated alone. However, the system did not yield useable microemulsions even after the addition of high quantities of co-surfactant. Similar results were obtained with Neodol® 91-2.5. Therefore, a step-wise procedure was carried out in which equal amounts of water and oil were mixed, and various combinations of the Tergitol® and Triton® were tested to systematically vary the hydrophilic/lypophilic balance (HLB). The various combinations were made using members of the Triton® and Tergitol® groups to prepare blends with increment values of 0.2. Microemulsions were synthesized using 10 wt % of each of these surfactant blends, and in all these studies, pentanol (5 wt %) was used as the co-surfactant. The surfactant blends that gave the best results had effective EO values of 7.8 to 8.2, or 8.6. The microemulsions produced using these nonionic surfactants were found to be very temperature sensitive, and the best-suited temperature for butyl acrylate microemulsions was found to be around 30° C. For this reason, all these samples were maintained in water bath at 31° C. until they equilibrated.

For nonionic surfactants with EO values in the range between 7.8 and 8.2, three layers were observed: 1) a top butyl acrylate-rich layer, 2) a bottom water-rich layer, and 3) a middle blue phase. These yielded the bicontinuous microemulsions. Since the samples were good in the range of 7.8 to 8.2, new combinations of surfactants were blended to give effective EO values of 7.9, 7.95, 8.00, 8.05, and 8.1 and were found to give good results.

A series of experiments were performed using lower surfactant concentrations of co-surfactant (2 wt %) and were also found to give microemulsions. However, these microemulsions were very temperature sensitive, and this combination was best suited at 31° C. (the clear microemulsions turned milky at 25° C.). An interesting observation was made on taking the samples out at hood temperature (22° C.). The bluish center layer in the samples between 7.9 and 8.1 separated itself into two bluish clouds. The larger of the two proceeded down while the smaller one proceeded up. So, at one time there were four layers with the center two having a bluish tinge, the bottom was a little hazy, and the top layer completely clear. The two center layers were very well demarcated.

The next step was to come up with a recipe that was stable at room temperature. It was found that changing the concentration of the co-surfactant by a small amount gave the emulsions that were stable at the hood temperature (22° C.). Similar experiments were also carried out using the sodium dodecylsulfate (SDS) surfactant (a co-surfactant level of 10 wt % was required to prevent gelling and frothing in the samples). All the ranges of surfactants that were synthesized earlier were again investigated using the 3 wt % of co-surfactant. Again, the best results were obtained in the ranges 7.9 and 8.1 and 8.6. But this time, the ranges from 8.8 to 9.8 also looked promising. The best stability of microemulsion came with SDS which solubilized 17 vol % of monomer into water producing single-phase, room-temperature-stable microemulsions. One unit gram of SDS and three unit grams of co-surfactant, 1-pentanol, were required for every unit milliliter of monomer. Therefore, this combination was selected in this particular example of the invention. To determine the exact nature of the microemulsions, light scattering experiments were necessary.

Dynamic light scattering experiments yielded the microemulsion droplet size of 14.7 nm. FIG. 1 illustrates these experimental results.

Example 2

Figure 2:
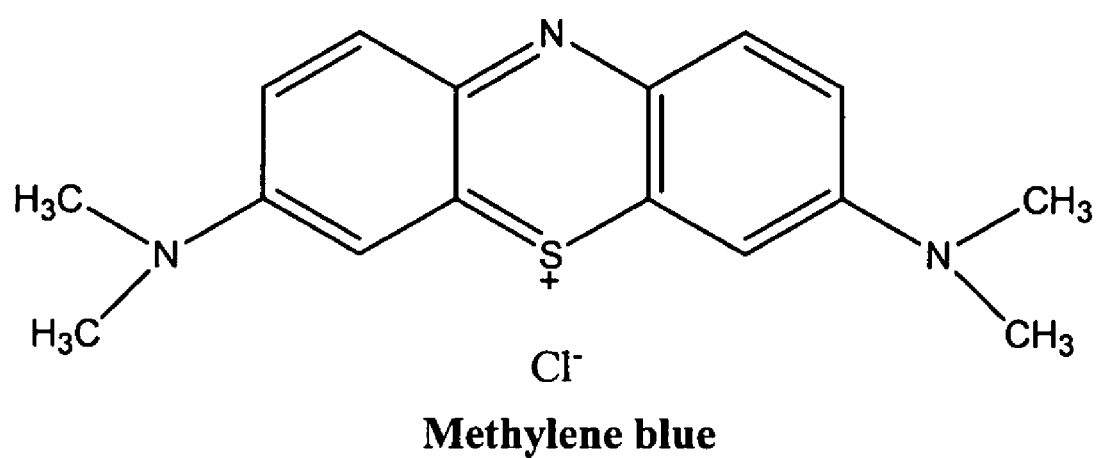
FIG. 2 shows the structures of methylene blue (MB) and N-methyldiethanolamine (MDEA) used in the two-component initiator system for Example 2.
Figure 2:
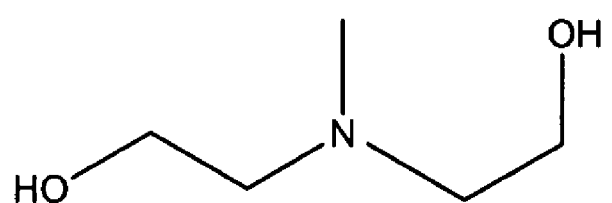

Polymerization of Butyl Acrylate with a Two-Component Photoinitiator System Containing a Light-Absorbing Molecule and an Electron Donor Based upon the criteria for selection of the initiator system described above, a two-component initiator system which produced active centers via photo-induced electron transfer was selected to demonstrate the invention. Specifically, a two-component initiator system consisting of 1) methylene blue (MB) as the light-absorbing molecule and 2) N-methyldiethanolamine (MDEA) as the electron donor was selected. The structures of these compounds are shown in FIG. 2. Methylene blue is a cationically charged dye and was selected 1) because it exhibits a prominent absorption peak centered at 656 nm and 2) because the methylene blue radical formed by electron transfer from the amine was not active for initiation. MDEA has been previously used as an electron donor for two- and three-component initiator systems in bulk polymerizations of organic monomers and was selected since it contains hydroxyl groups that will be incorporated as chain ends (end group functionalities) upon initiation.

Figure 3:
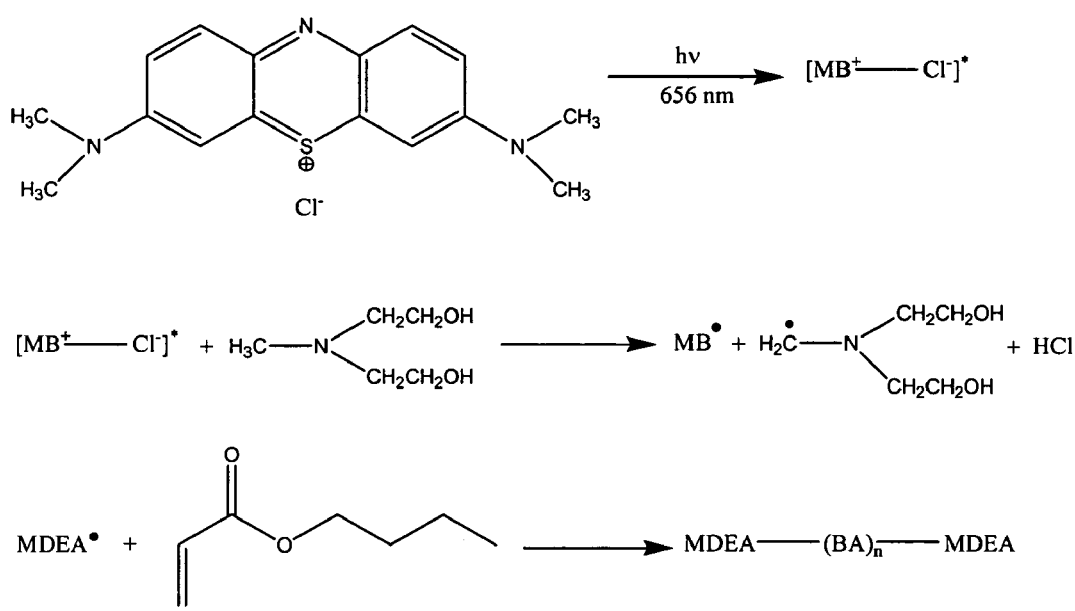
FIG. 3 shows the reaction mechanism of a two-component initiator system, such as that used in Example 2. MB absorbs a photon in the visible region of light. The excited dye extracts an electron from MDEA followed by a proton transfer from amine resulting in the formation of an active MDEA initiating radical which then comes into contact with butyl acrylate which starts to chain polymerize by breaking the double bond of the monomer.

Microemulsions of the monomer in water were polymerized using this two-component initiator system and a visible light source. The mechanism for the photoinitiation reaction is outlined in FIG. 3. This figure illustrates that the active center which initiates the polymerization arises from the MDEA molecule (the MB radical remains in the aqueous phase and is not active for the polymerization).

The polymerized product was purified by dialysis and further investigated using NMR and gel permeation chromatography (GPC).

NMR characterization of the resulting polymer revealed that the polymer end groups are indeed MDEA (each end group containing two hydroxyl groups imparted by the MDEA molecule). The number average degree of polymerization obtained using NMR (assuming two end groups per molecule chain) was found to depend upon the initiator concentration, as indicated in Table 1. The evaluation of the results indicates that the polymer size was inversely dependent upon the initiator concentration in the system.

TABLE 1

Effect of variation of initiator concentration upon the number average degree of conversion of the monomer determined using NMR spectroscopy.

| Run Case | MB concentration (M) × $10^5$ | MDEA concentration (M) | $X_n$ |
|---|---|---|---|
| 1 | 2.246 | 0.0349 | 740 |
| 2 | 2.635 | 0.0349 | 540 |
| 3 | 2.951 | 0.0349 | 390 |
| 4 | 3.209 | 0.0349 | 160 |

The polymer molecular weight was also characterized using size exclusion chromatography, commonly known as gel permeation chromatography (GPC). Tetrahydrofuran (THF) was selected as the solvent for these chromatography experiments based on the solubility of the polymer synthesized. Polystyrene standards were used to create the calibration curve. The GPC results, which are summarized in Table 2, confirmed that the polymers are relatively monodisperse in nature (compared to standard free radical polymerizations in which the theoretically best possible polydispersity index is in the range of 2-5). In addition, the number average degree of polymerization obtained from GPC was consistent with the previously obtained values from NMR. These results are also presented in Table 2.

TABLE 2

GPC calibration table comparison of number average degree of polymerization obtained from GPC with NMR. The table also indicates the polydispersity index (PDI) of the polymers.

| MB concentration (M) × 10⁵ | $X_n$ (GPC) | $X_n$ (NMR) | PDI |
|---|---|---|---|
| 3.209 | 185 | 160 | 1.23 |
| 2.951 | 410 | 390 | 1.46 |
| 2.635 | 600 | 540 | 1.25 |
| 2.246 | 690 | 740 | 1.50 |

Figure 4:
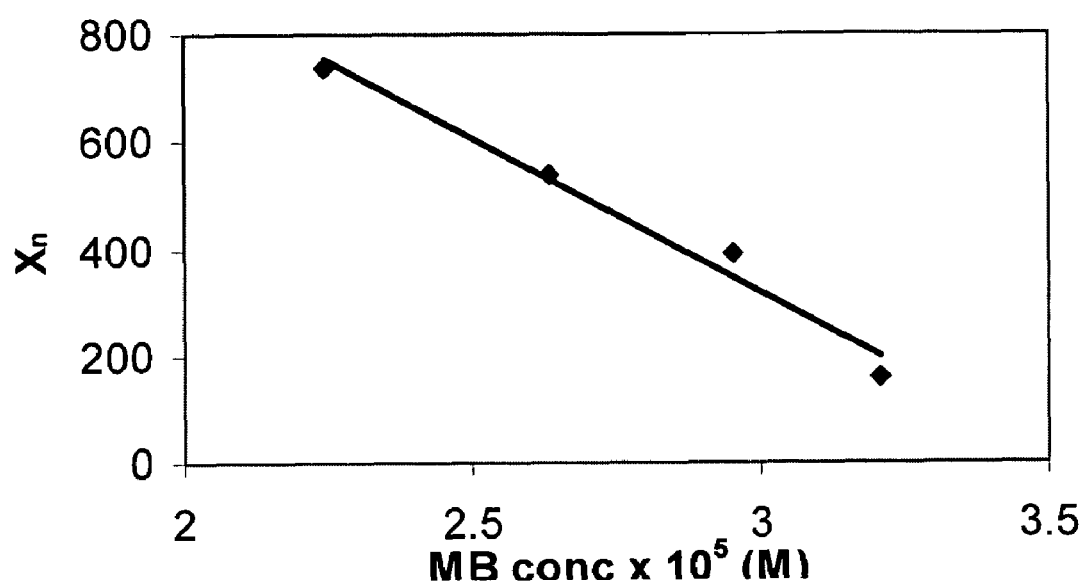
FIG. 4 is a plot of number average degree of polymerization ($X_n$) vs. initiator concentration for Example 2. MB indicates the methylene blue concentration. The MDEA concentration is 0.0349 M for all samples.

FIG. 4 illustrates the variation of number average degree of polymerization (obtained from NMR) with the initiator concentration. It was observed that this number average degree decreases linearly with the increase in the initiator concentration, as expected.

Example 3

Polymerization of Butyl Acrylate with a Hydrogen Abstraction Photoinitiator

The microemulsion system used in the studies above was selected for these investigations. In this example, monomer-in-water microemulsions were prepared using butyl acrylate as the monomer, sodium dodecylsulfate as surfactant, and 1-pentanol as co-surfactant. The best stability of this microemulsion had come (as discussed above) with SDS which solubilized 17 vol % of monomer into water producing single-phase, room-temperature-stable microemulsions. Dynamic light scattering experiments had yielded a microemulsion droplet diameter of 14.7 nm.

Based upon the previously described criteria for selection of the hydrogen abstraction photoinitiator, an iodonium salt was selected which produced active centers via photo-induced electron transfer. An example of a hydrogen abstraction photoinitiator that successfully produced polymers was provided when diphenyliodonium chloride was used as the light-absorbing molecule (this molecule absorbs light in the UV region of the spectrum to produce reactive intermediates that abstract hydrogens from surrounding molecules). Microemulsions of the monomer in water were polymerized using diphenyliodonium chloride and a UV light source.

Figure 5:
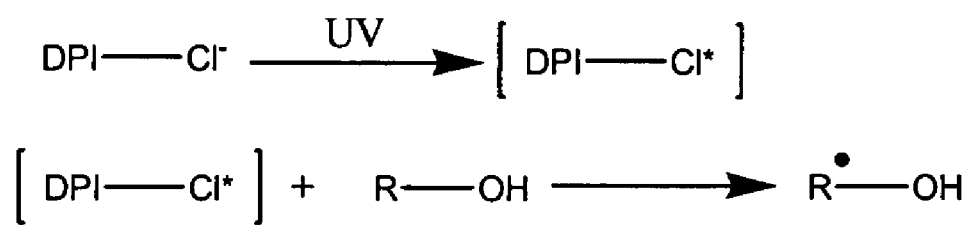
FIG. 5 is the reaction mechanism in Example 3 for polymerization with diphenyl iodonium chloride which is a hydrogen-abstraction photoinitiator. This reaction is carried out in UV light and generates the active centers from the co-surfactant, pentanol.

It was found that in this case, the pentanol molecules which are the co-surfactant molecules, attached themselves as the end group of the polymer chains (pentanol radicals were apparently formed by hydrogen abstraction from the pentanol). This established the fact that, in general, molecules with abstractable hydrogens can be used as co-surfactants which also act as part of the photoinitiation system. The governing reaction mechanism is illustrated in FIG. 5. This figure illustrates that the active center which initiates the polymerization arises from the co-surfactant (1-pentanol) molecule.

The polymerized product was purified by dialysis and further investigated using NMR and GPC. NMR characterization of the resulting polymer revealed that the polymer end groups were from the pentanol molecule (each end group containing one hydroxyl group imparted by the co-surfactant molecule).

Throughout this application, various publications are referenced. The disclosures of these publications in their entireties are hereby incorporated by reference into this application in order to more fully describe the compounds, compositions and methods described herein.

What is claimed is:

1. A method for producing a polymer or oligomer with controlled molecular weight and desired end group functionality comprising
    a) forming a single phase monomer in water microemulsion comprising monomer, water, and an effective amount of an effective surfactant,
    b) selecting a water-soluble photo-initiator system designed to produce one kind of monomer-soluble radical active centers containing the desired end group functionalities for the polymer or oligomer, wherein the desired end group is selected from the group consisting of a hydroxyl, an isocyanate, a cyanide, a nitro, a nitrile, and an amine;
    c) adding to the microemulsion an amount of the water-soluble photo-initiator system chosen to provide the polymer or oligomer having the controlled molecular weight;
    d) selecting a temporal and spatial illumination scheme, wherein the temporal illumination scheme is chosen to produce the polymer or oligomer having the controlled molecular weight; and
    e) after step d), illuminating the microemulsion according to the selected temporal and spatial illumination scheme to photoinitiate polymerization of the monomer and to provide the polymer or oligomer having the desired end group functionalities and controlled molecular weight.

2. The method of claim 1 wherein the microemulsion further comprises an effective amount of an effective co-surfactant.

3. The method of claim 1 wherein the monomer comprises an acrylate, a methacrylate, methyl acrylate, ethyl acrylate, butyl acrylate, hydroxyethyl acrylate, alkyl acrylate, methyl (methacrylate), hydroxyethyl methacrylate, hexanediol dimethacrylate, or mixtures thereof.

4. The method of claim 1 wherein the monomer comprises a styrene, an α-methyl styrene or mixtures thereof.

5. The method of claim 1 wherein the monomer comprises a 1,3-diene, ethene, or mixtures thereof.

6. The method of claim 1 wherein the monomer comprises a halogenated olefin.

7. The method of claim 1 wherein the monomer comprises a vinyl chloride.

8. The method of claim 1 wherein the monomer comprises a vinyl ester.

9. The method of claim 1 wherein the monomer comprises an acrylonitrile, a methacrylonitrile, or mixtures thereof.

10. The method of claim 1 wherein the monomer comprises an acrylamide, a methacrylamide, or mixtures thereof.

11. The method of claim 1 wherein the monomer is butyl acrylate.

12. The method of claim 1 wherein the monomer is chosen for its preferred mode of termination of the polymer chain by combination or disproportionation.

13. The method of claim 1 wherein the monomer determines whether the polymer has one or two end groups of the desired functionality.

14. The method of claim 1 wherein the monomer and initiator system are chosen to select the kind and number of end group functionalities.

15. The method of claim 2 wherein the surfactant and co-surfactant are chosen based on the calculated hydrophile-lipophile balance (HLB) number wherein the HLB number is that at which the monomer will be emulsified.

16. The method of claim 1 wherein the surfactant comprises sodium dodecyl sulfate, octyl phenoxy poly(ethoxy) ethanol, alcohols and ethoxylates, propylene oxide/ethylene oxide copolymer, polyoxyethylene-10-oleyl ether, ethoxylated monodiglycerides, or mixtures thereof.

17. The method of claim 2 wherein the co-surfactant comprises propanol, butanol, pentanol, hexanol, heptanol, dodecanol, hexadecanol, ethylene glycol, glycerin, propylene glycol, or mixtures thereof.

18. The method of claim 1 wherein the monomer comprises an acrylate, a methacrylate, a styrene, an α-methyl styrene, a 1,3-diene, a halogenated olefin, a vinyl ester, an acrylonitrile, a methacrylonitrile, an acrylamide, a methacrylamide, or mixtures thereof.

19. The method of claim 1 wherein the surfactant is sodium dodecyl sulfate.

20. The method of claim 1 wherein the monomer comprises methyl acrylate, ethyl acrylate, butyl acrylate, hydroxyethyl acrylate, alkyl acrylate, acrylonitrile, styrene, or mixtures thereof.

21. The method of claim 2 wherein the co-surfactant is 1-pentanol.

22. The method of claim 1 wherein the monomer comprises methyl(methacrylate), hydroxyethyl methacrylate, ethene, hexanediol dimethacrylate, vinyl chloride, methyl acrylate, alkyl methacrylate or mixtures thereof.

23. The method of claim 1 wherein the initiator system is about 0.1 to about 10 wt % of the monomer.

24. The method of claim 1 wherein the initiator system is about 4 to about 6 wt % of the monomer.

25. The method of claim 1 wherein the initiator system is a one-component initiator system.

26. The method of claim 1 wherein the initiator system is a two-component initiator system.

27. The method of claim 26 wherein the two-component system comprises one light-absorbing component and a second component which reacts with the excited state of the light-absorbing component.

28. The method of claim 27 wherein the light absorbing component absorbs light in a desired initiating region of the spectrum.

29. The method of claim 27 wherein the second component is an electron donor and the light absorbing component has a reduction potential which makes electron transfer thermodynamically feasible.

30. The method of claim 29 wherein the electron donor second component is trimethylamine, 1,2',3''-trichlorotripropylamine, triethylamine, N,N-dimethylpentylamine, N,N-dimethyl-m-nitroaniline, dimethylethanolamine (DMEA), N,N-dimethylcyclohexylamine, 3,3',3''-nitrilotripropionic acid, N-ethyl-N-propyl-1-acridinamine, N-phenylglycine, N,N-dimethylacetamide, N,N-dimethylurea, methyldiethanolamine (MDEA), N,N-dimethylbenz[a]antracen-6-amine, 3,9-dimethyl-3,6,9-triazadodecanedioic acid, N-ethyl-N-propylaniline, or N,N-diethyl-2-furanamine.

31. The method of claim 27 wherein the second component is an electron acceptor and the light absorbing component has an oxidation potential which makes electron transfer thermodynamically feasible.

32. The method of claim 31 wherein the electron acceptor second component is diazonium salt, diphenyl iodonium salt, triphenyl sulfonium salt, dialkyl-4-hydroxyphenylsulfonium salt, dialkyl phenacyl sulfonium salt, pyrylium salt, thiopyrylium salt, pyridinium salt, or quinolinium salt.

33. The method of claim 27 wherein the light absorbing component comprises methylene blue, rose bengal, eosin Y, fluorescein, rhodamine, sulforhodamine, or cyanine.

34. The method of claim 1 wherein the initiator system is a hydrogen abstraction initiator.

35. The method of claim 34 wherein the hydrogen abstraction initiator system comprises diphenyl iodonium chloride.

36. The method of claim 1 wherein the initiator system comprises hydroxyl alkyl ketone (HAP), 4-(2-hydroxyethoxy)phenyl-(2-hydroxy-2-propyl)ketone (HPPK), methyl thio phenyl morpholino ketone (TPMK), or sulfonic ester of α-hydroxy methyl benzoin derivative.

37. The method of claim 1 wherein the initiator system comprises iodonium salt, triaryl sulfonium salt, amino phenyl ketone, acetophenone, benzophenone, thioxanthone, or benzil.

38. The method of claim 1 wherein the initiator system comprises methylene blue and N-methyldiethanolamine.

39. The method of claim 1 wherein the molecular weight of the polymer or oligomer is determined by the amount of initiator.

40. The method of claim 39 further comprising purifying the separated polymers or oligomers.

41. The method of claim 1 wherein the molecular weight of the polymer or oligomer is determined by the temporal illumination scheme.

42. The method of claim 1 wherein the molecular weight of the polymer or oligomer is determined by the amount of initiator and the temporal illumination scheme.

43. The method of claim 1 wherein the polymer or oligomer has a polydispersity index of about 1 to about 2.

44. The method of claim 1 wherein the illuminating is with UV light.

45. The method of claim 1 wherein the illuminating is with visible light.

46. The method of claim 1 wherein the method is performed at about room temperature.

47. The method of claim 1 further comprising reacting end group functionalities of the polymers or oligomers to produce a copolymer.

48. The method of claim 47 further comprising separating the end functionalized polymers or oligomers from the microemulsion prior to reacting the end groups.

49. The method of claim 47 wherein the reacting of the end groups is a copolymerization reaction.

50. The method of claim 47 wherein the copolymer is a block copolymer.

51. The method of claim 47 wherein the copolymer is a graft copolymer.

52. The copolymer produced by the method of claim 47.

53. The method of claim 1 wherein the polymer terminates by combination and wherein the end functionalities are the same.

54. The method of claim 1 wherein the polymer terminates by disproportionation.

55. The method of claim 54 wherein the method is carried out at a temperature chosen to determine the desired degree of disproportionation.

56. The method of claim 1 wherein the monomer is selected by its preferred mode of termination and wherein the selection of monomer determines whether each chain contains one or two end groups of the specified functionality derived from the initiator system.

57. The polymer produced by the method of claim 1.

58. A polymer produced by a method comprising a) forming a single phase monomer in water microemulsion comprising monomer, water, and an effective amount of an effective surfactant,
b) selecting a water-soluble photo-initiator system designed to produce one kind of monomer-soluble radical active centers containing the desired end group functionalities for the polymer or oligomer, wherein the desired end group is selected from the group consisting of a hydroxyl, isocyanate, cyanide, nitro, nitrile, and an amine,
c) adding to the microemulsion an amount of the water-soluble photo-initiator system chosen to provide the polymer or oligomer having the controlled molecular weight;
d) selecting a temporal and spatial illumination scheme, wherein the temporal illumination scheme is chosen to produce the polymer or oligomer having the controlled molecular weight; and
e) after step d), illuminating the microemulsion according to the selected temporal and spatial illumination scheme to photoinitiate polymerization of the monomer and to provide the polymer or oligomer having the desired end group functionalities and controlled molecular weight.

* * * * *